United States Patent
Toyoda

(10) Patent No.: US 6,530,669 B2
(45) Date of Patent: Mar. 11, 2003

(54) SPREAD ILLUMINATING APPARATUS WITH A FRAME HAVING A SPRING FORCE

(75) Inventor: Koichi Toyoda, Iwata-gun (JP)

(73) Assignee: Minebea Co., Ltd., Nagano-ken (JP)

( * ) Notice: Subject to any disclaimer, the term of this patent is extended or adjusted under 35 U.S.C. 154(b) by 0 days.

(21) Appl. No.: 09/978,573

(22) Filed: Oct. 18, 2001

(65) Prior Publication Data

US 2002/0057563 A1 May 16, 2002

(30) Foreign Application Priority Data

Oct. 26, 2000 (JP) ........................................ 2000-327088

(51) Int. Cl.⁷ ................................................. F21V 7/04
(52) U.S. Cl. ........................... 362/31; 362/97; 362/330; 362/26; 362/27; 362/581; 349/61
(58) Field of Search .......................... 362/31, 97, 330, 362/800, 26, 27, 581; 349/61, 64, 63, 65, 67, 70

(56) References Cited

U.S. PATENT DOCUMENTS

| | | | | |
|---|---|---|---|---|
| 6,046,785 A | * | 4/2000 | Won | 349/58 |
| 6,219,116 B1 | * | 4/2001 | Yuuki et al. | 349/58 |
| 6,390,639 B2 | * | 5/2002 | Suzuki et al. | 362/31 |
| 6,454,423 B1 | * | 9/2002 | Suzuki et al. | 362/31 |

OTHER PUBLICATIONS

U.S. Pub. No. 2001/0050847, Suzuki et al., Dec. 13, 2001, Spread Illuminating Apparatus.*

* cited by examiner

Primary Examiner—Sandra O'Shea
Assistant Examiner—Sharon Payne
(74) Attorney, Agent, or Firm—Oliff & Berridge, PLC

(57) ABSTRACT

There is provided a spread illuminating apparatus ensuring excellent light utilization efficiency without deteriorating workability in assembling. A first extension plate and a second extension plate, which are bent so as to have a spring force working toward each other, are provided on an upper opposing plate of a frame. A spot-like light source and a light conductive member are pressed by means of the spring force of the above extension plates. A clearance between the spot-like light source and the first extension plate, and a clearance between the light conductive member and the second extension plate are eliminated, whereby generation of play can be prevented resulting in an improvement of workability in assembling. Also, the spot-like light source and the light conductive member contact tightly with each other eliminating a clearance therebetween so as to improve light utilization efficiency. The frame and further the whole apparatus can be compact while maintaining a high accuracy.

2 Claims, 4 Drawing Sheets

SPREAD ILLUMINATING APPARATUS WITH A FRAME HAVING A SPRING FORCE

BACKGROUND OF THE INVENTION

1. Field of the Invention

The present invention relates to a spread illuminating apparatus particularly a spread illuminating apparatus used as an illuminating means for a liquid crystal display.

2. Description of the Related Art

A liquid crystal display operating in low power consumption features low profile and light weight and there is a growing demand therefor mainly in a computer field. Since a liquid crystal which is a component of the liquid crystal display does not emit light by itself unlike a light emitting element such as a cathode-ray tube, an illuminating means for observing an image is separately required. According to the recent specific demand for lower profile configuration, there has been a growing tendency to employ a spread illuminating apparatus of thin-plate side light type (light conductive-plate type) as an illuminating means for the liquid crystal display.

An example of such a side light type spread illuminating apparatus is shown in FIG. 5.

In FIG. 5, a spread illuminating apparatus 1 is generally composed such that a bar-like light conductive member 5 is disposed along one end surface 3 of a transparent substrate 2 made of a light-transmissible material, a spot-like light source 6 mounted on a flexible printed circuit board (FPC) 6A is disposed on one end of the light conductive member 5 and that a frame 9 is held to the transparent substrate 2 so as to cover the light conductive member 5 and the spot-like light source 6.

The frame 9 is generally composed of a base plate 9a facing the end surface 3 of the transparent substrate 2 with the light conductive member 5 and the spot-like light source 6 interposed therebetween, two opposing plates (the opposing plates on upper and lower sides in FIG. 5 are referred to as an "upper opposing plate 9b" and a "lower opposing plate 9c", respectively) continuous with and substantially orthogonal to the base plate 9a and opposing each other in such a manner as to clamp a portion 8 (hereinafter referred to as a "transparent substrate proximal portions") positioned toward the end surface 3 of the transparent substrate 2, and two extension plates 9d bent at both ends of the upper opposing plate 9b so as to face each other.

The frame 9 is disposed so as to house the spot-like light source 6 and the light conductive member 5 with the upper opposing plate 9b and the lower opposing plate 9c touching the transparent substrate proximal portion 8, respectively.

In the spread illuminating apparatus, since the spot-like light source and the light conductive member are fitted in the frame to be assembled, a certain clearance D is required between the frame 9 and the spot-like light source 6 or the light conductive member 5 as shown in FIG. 6, and a clearance E is apt to be present between the spot-like light source 6 and the light conductive member 5.

However, when the clearances D and E are present as described above, light utilization efficiency (the total efficiency) is deteriorated. Accordingly, the presence of any clearance is not desirable for effectively maintaining the light utilization efficiency.

Further, when large spot-like light source and light conductive member are employed, the extension plates 9d are pressed with the spot-like light source 6 and the light conductive member 5 and move outward as shown in FIG. 7 in the above conventional art. Consequently, the frame 9 is not applicable for the large spot-like light source and light conductive member.

SUMMARY OF THE INVENTION

The present invention has been made in the light of the above problems, and an object of the present invention is to provide a spread illuminating apparatus capable of ensuring excellent light utilization efficiency while maintaining workability in assembling.

According to a first aspect of the present invention, in a spread illuminating apparatus in which a bar-like light conductive member is disposed along at least one end surface of a transparent substrate made of a light-transmissible material, a spot-like light source is disposed on at least one end of the light conductive member, and in which a frame is held to the transparent substrate so as to cover the light conductive member and the spot-like light source, the frame generally comprises a base plate facing an end surface of the transparent substrate with the light conductive member and the spot-like light source interposed therebetween, two opposing plates continuous with the base plate and opposing each other in such a manner as to clamp the transparent substrate at a portion toward the end surface thereof, and two extension plates bent at both ends of at least one of the two opposing plates so as to face each other, with at least one extension plate having a spring force working toward the other extension plate.

According to a second aspect of the present invention, in the spread illuminating apparatus of the first aspect of the present invention, the two extension plates are provided on one opposing plate disposed on an observation surface side of the transparent substrate.

DESCRIPTION OF THE PREFERRED EMBODIMENTS

Figure 4:
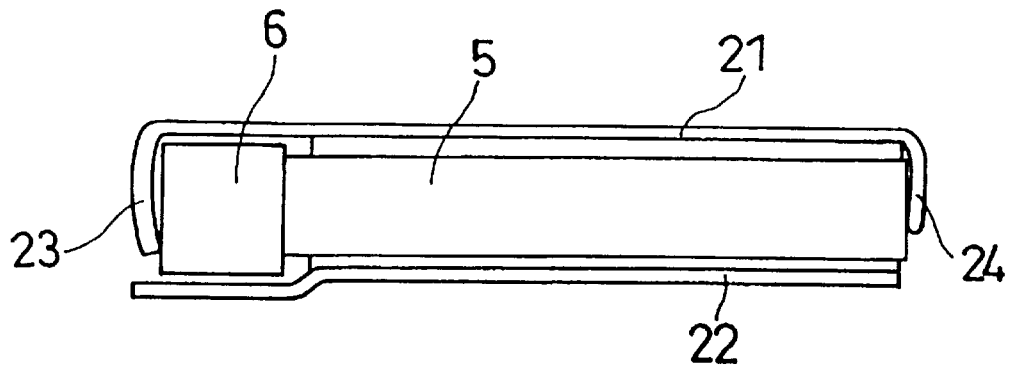
FIG. 4 is a schematic representation showing how the frame, a spot-like light source and a light conductive member in FIG. 1 are assembled.
Figure 5:
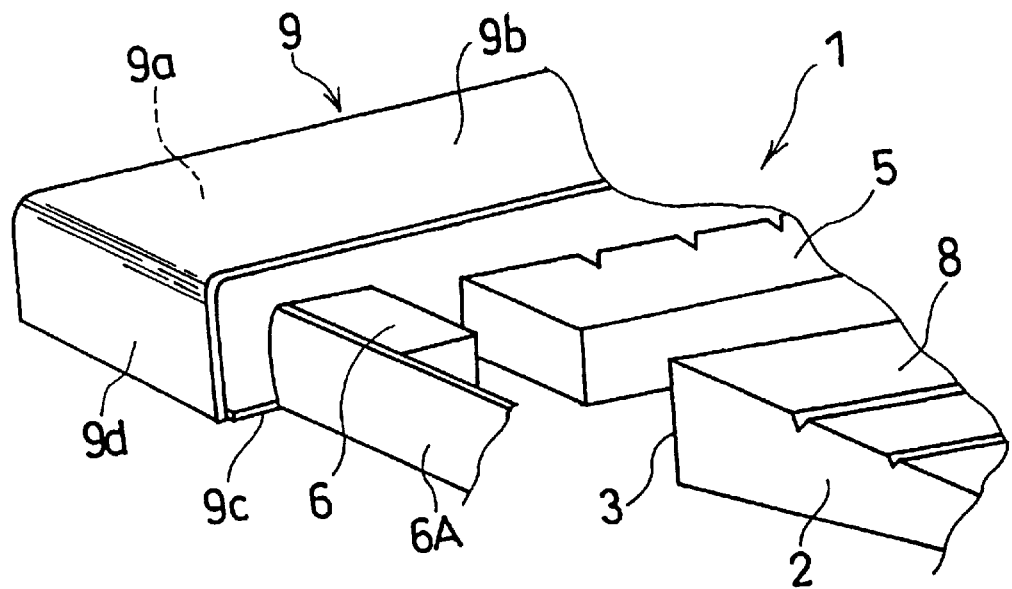
FIG. 5 is a perspective view showing a conventional spread illuminating apparatus.
Figure 6:
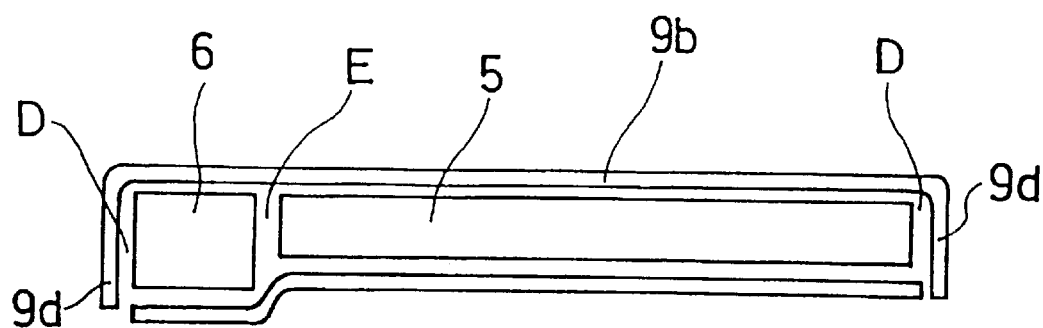
FIG. 6 is a schematic representation showing how the frame, the spot-like light source and the light conductive member in FIG. 5 are assembled.
Figure 7:
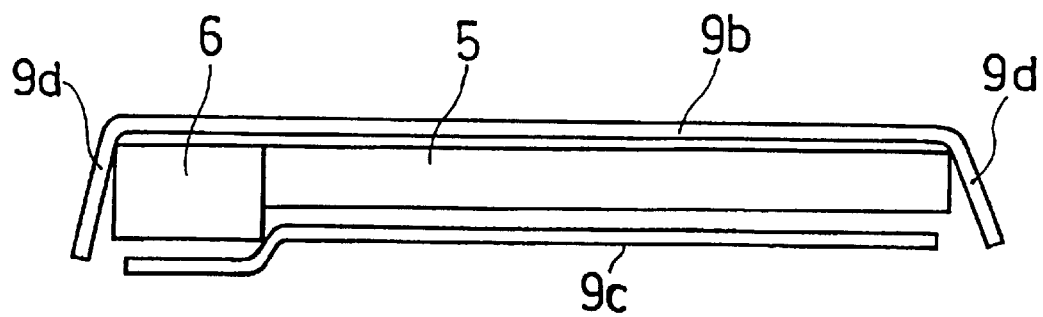
FIG. 7 is a schematic representation showing a state of the frame when large spot-like light source and light conductive member are applied therein.

A spread illuminating apparatus 1A according to a first embodiment of the present invention will be described with reference to FIGS. 1 to 4. Note that parts and components identical with or equivalent to those in FIGS. 5 to 7 are indicated by the same references and a detailed description thereof is omitted.

The spread illuminating apparatus 1A is generally composed such that a bar-like light conductive member 5 is disposed along one end surface 3 of a transparent substrate 2 made of a light-transmissible material, a spot-like light source 6 comprising a light emitting diode mounted on a flexible printed circuit board (FPC) 6A is disposed on one end 5c of the light conductive member 5, and that a frame 15 is held to the transparent substrate so as to cover the light conductive member 5 and the spot-like light source 6.

The spread illuminating apparatus 1A is disposed so as to cover an observation surface of, for example, a reflection-type liquid crystal element (not shown) and used as an auxiliary illumination. The transparent substrate 2 is formed in a so-called wedge-shape where the thickness decreases gradually with the increase in distance from the end surface 3.

A light reflection pattern 12 is formed on an upper surface (an observation surface on an upper side in FIG. 1) 11a of the transparent substrate 2. A surface on a lower side in FIG. 1 opposing the upper surface 11a is referred to as a lower surface 11b.

The light reflection pattern 12 comprises a plurality of grooves 13 substantially triangular in section and a plurality of flat portions 14 adjacent to the grooves 13, and the ratio of the width (occupied area) of the grooves 13 to the width (occupied area) of the flat portions 14 is set to gradually increase in proportion to the increase in distance from the end surface 3 of the transparent substrate 2.

Since the grooves 13 of the light reflection pattern 12 formed on the transparent substrate 2 are finely constructed, they are hardly observable in a screen observation.

An optical path conversion means 16 in the light conductive member 5 is provided on a surface (a second surface of the light conductive member) 5b opposite to a surface (a first surface of the light conductive member) 5a facing the transparent substrate 2. The optical path conversion means 16 is composed of grooves 16a substantially triangular in section and flat portions 16b formed therebetween.

The frame 15 is formed of a metal material such as aluminum and stainless steel (for example, SUS304), is set to have a given thickness (for example, 0.1 mm), and has its inside surface mirror-finished thereby obtaining a light reflection function.

Figure 1:
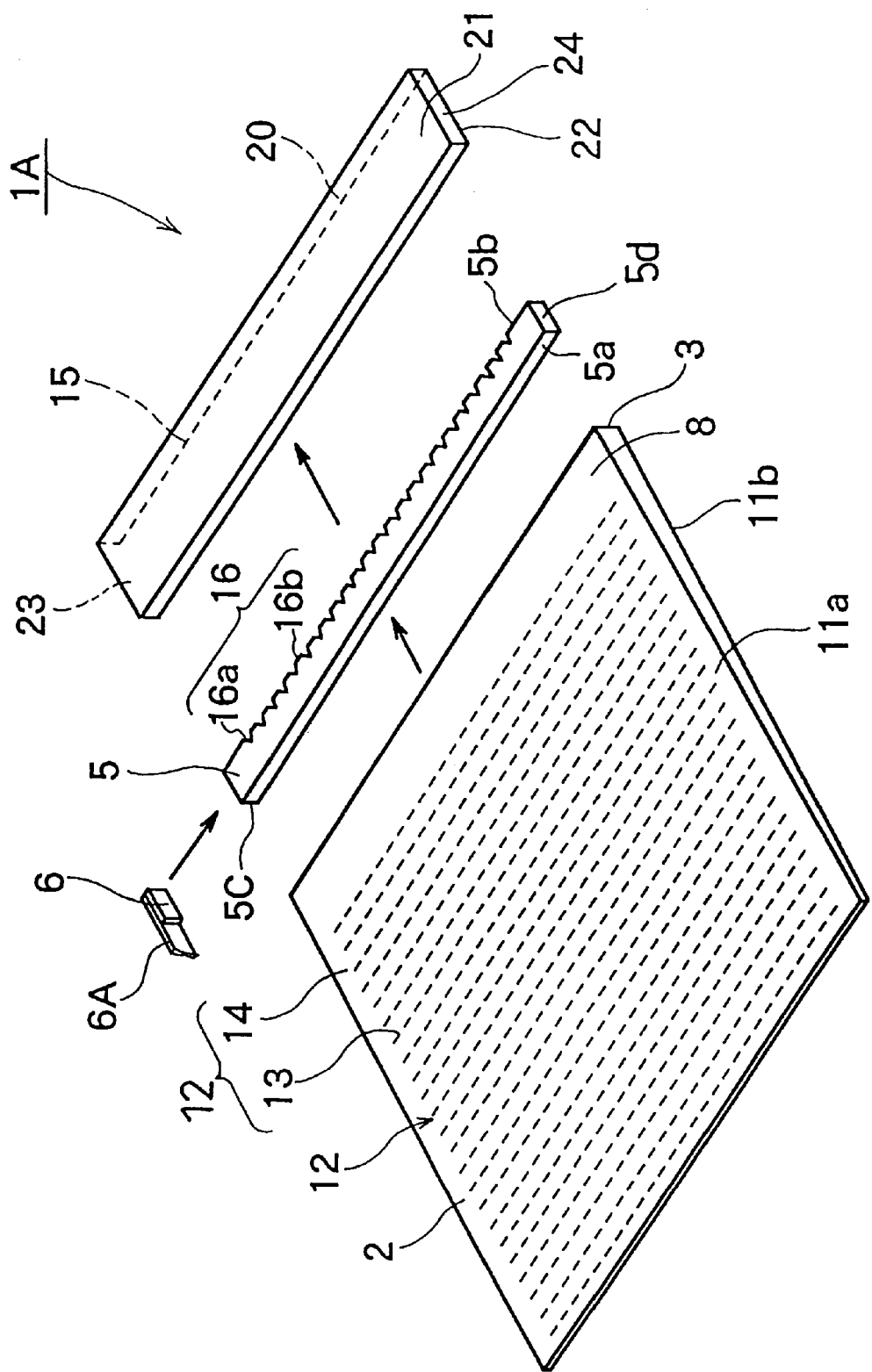
FIG. 1 is an exploded perspective view showing a spread illuminating apparatus according to a first embodiment of the present invention.
Figure 2:
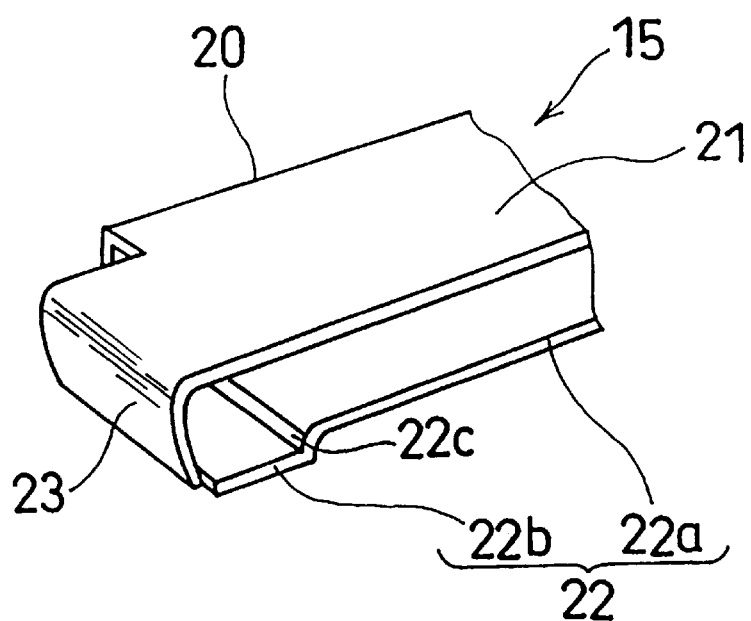
FIG. 2 is a perspective view showing a part of a frame in FIG. 1.
Figure 3:
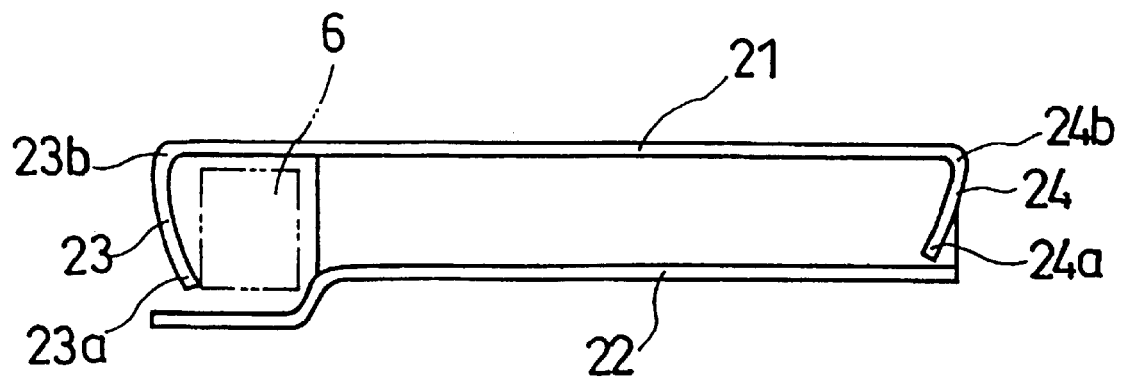
FIG. 3 is a schematic representation showing a stationary state of the frame in FIG. 1.

The frame 15 is generally composed of a base plate 20 facing the end surface 3 of the transparent substrate 2 with the light conductive member 5 and the spot-like light source 6 interposed therebetween, two opposing plates (the opposing plates on the upper and lower sides in FIG. 1 are hereinafter referred to as an "upper opposing plate 21" and a "lower opposing plate 22", respectively) continuous with and substantially orthogonal to the base plate 20 and opposing each other so as to clamp a portion 8 (hereinafter referred to as a "transparent substrate proximal portion") located toward the end surface 3 of the transparent substrate 2, and two extension plates (the extension plates on left and right sides in FIG. 3 are hereinafter referred to as a "first extension plate 23" and a "second extension plate 24", respectively) bent at both ends of the upper opposing plate 21 so as to face each other.

The frame 15 is disposed so as to house the spot-like light source 6 and the light conductive member 5 with the upper opposing plate 21 and the lower opposing plate 22 touching the transparent substrate proximal portion 8.

The first extension plate 23 and the second extension plate 24 are bent so as to generate a spring force working toward each other. The first extension plate 23 is bent to be inclined so that a distal end 23a thereof is closer to the second extension plate 24 than a proximal end 23b before assembly. Similarly, the second extension plate 24 is bent to be inclined so that a distal end 24a thereof is closer to the first extension plate 23 than a proximal end 24b.

The lower opposing plate 22 is composed of a main plate 22a adapted to receive the light conductive member 5 thereon and a stepped plate 22b continuous with the main plate 22a via a step 22c, positioned lower than the main plate 22a and adapted to receive the spot-like light source 6 thereon.

The frame 15, the spot-like light source 6 and the light conductive member 5 described above are assembled, for example, in such a manner that the second extension plate 24 of the frame 15 is pushed outward to ensure a space for putting in the spot-like light source 6 and the light conductive member 5, then the spot-like light source 6 and the conductive member 5 are fitted in the space with the first extension plate 23 pressed against a fixed object.

When the spot-like light source 6 and the light conductive member 5 are placed in a prescribed space between the upper opposing plate 21 and the lower opposing plate 22, the second extension plate 24 tends to rebound to the original position thereby pressing the light conductive member 5 toward the spot-like light source 6. Since the first extension plate 23 has a spring force as described above, the spot-like light source 6 and the light conductive member 5 are both pressed toward the second extension plate 24. At the same time, the spot-like light source 6 and the light conductive member 5 are both pressed toward the first extension plate 23 by means of the second extension plate 24 having also a spring force.

As described, in the present embodiment, the spot-like light source 6 and the light conductive member 5 are pressed by means of the spring force of the first extension plate 23 and the second extension plate 24. Accordingly, as illustrated in FIG. 4, no clearance will be present between the spot-like light source 6 and the first extension plate 23 and between the light conductive member 5 and the second extension plate 24 (the tolerance of the constituent members is offset by the press-fitting), whereby the generation of play between the members can be prevented.

And, since the first extension plate 23 and the second extension plate 24 both press the spot-like light source 6 and the light conductive member 5, respectively, toward each other, the spot-like light source 6 and the light conductive member 5 contact tightly with each other so as to eliminate a clearance therebetween. Accordingly, the light utilization efficiency can be improved.

When the spot-like light source 6 and the light conductive member 5 are placed in the frame 15 with the second extension plate 24 of the frame 15 pushed outward and brought to respective predetermined positions, the second extension plate 24 which has a spring force tends to return to its original position, thereby pressing, together with the first extension plate 23, the spot-like light source 6 and the light conductive member 5. The frame 15, the spot-like light source 6 and the light conductive member 5 are thus put together by means of the spring force of the first extension plate 23 and the second extension plate 24, so the assembly can be managed without any clearance which has been conventionally required. Further, since the assembly can be carried out without allowing for a certain clearance, the frame 15 and further the entire apparatus can be made compact while achieving a high accuracy.

In the above embodiment, the first extension plate 23 and the second extension plate 24 are provided on the upper opposing plate 21, and the spring force is given to both extension plates; however, the spring force may be given to either the first extension plate 23 or the second extension plate 24 and the first extension plate 23 and the second extension plate 24 may be provided on the lower opposing plate 22.

Moreover, the spot-like light source 6 is provided on one end 5c of the light conductive member 5; however, the spot-like light source may be provided on another end 5d (see FIG. 1) of the light conductive member 5 opposing the one end 5c, or may be provided on both the end 5c and the end 5d.

Further, the light conductive member 5 is disposed along the end surface 3 of the transparent substrate 2; however, the light conductive member may be disposed along two end surfaces of the transparent substrate opposing each other. In this configuration, the spot-like light source may be disposed on at least one end of each light conductive member, and therefore may, of course, be disposed on both ends of each light conductive member (hence four spot-like light sources).

Still further, the spot-like light source 6 comprises a light emitting diode; however, the present invention is not limited thereto, and the spot-like light source 6 may comprise, for example, an incandescent bulb which can be lit at a relatively low voltage.

Furthermore, the transparent substrate 2 is formed in a wedge-shape; however, the present invention is not limited thereto, and the transparent substrate may be formed plate-like.

In addition, the frame 15 is squarish U-shaped in section; however, the present invention is not limited thereto, and the frame may be U-shaped (the base plate 20 is curved).

And, in the above embodiment, both the first extension plate 23 and the second extension plate 24 have a spring force working toward each other; however, either the first extension plate 23 or the second extension plate 24 may have a spring force working toward the other extension plate.

In accordance with the first aspect of the present invention, when assembling the frame, the light conductive member and the spot-like light source, one extension plate presses, together with the other extension plate, the light conductive member and the spot-like light source disposed between the extension plates. Since no clearance is present between the spot-like light source and the frame and between the light conductive member and the frame (the tolerance is offset by the press-fitting), the generation of play between the members can be prevented, whereby workability in assembling can be improved. Further, by pressing the spot-like light source and the light conductive member by the two extension plates, the spot-like light source and the light conductive member contact tightly with each other, whereby a clearance therebetween can be eliminated resulting in the improvement of the light utilization efficiency.

In accordance with the second aspect of the present invention, similar to the configuration in the first aspect of the present invention, the generation of play for each member can be prevented, whereby workability in assembling can be improved resulting in the improvement of the light utilization efficiency.

What is claimed is:

1. A spread illuminating apparatus comprising: a bar-like light conductive member disposed along at least one end surface of a transparent substrate made of a light-transmissible material; a spot-like light source mounted on at least one end of the light conductive member; and a frame held to the transparent substrate so as to cover the light conductive member and the spot-like light source, characterized in that the frame generally comprises: a base plate facing an end surface of the transparent substrate with the light conductive member and the spot-like light source interposed therebetween; two opposing plates continuous with the base plate and opposing each other so as to clamp a portion toward the end surface of the transparent substrate; and two extension plates bent at both ends of at least one of the two opposing plates so as to face each other with at least one of the two extension plates having a spring force working toward the other extension plate.

2. A spread illuminating apparatus according to claim 1, wherein the two extension plates are provided on one opposing plate disposed on an observation surface side of the transparent substrate out of the two opposing plates.

* * * * *